(12) United States Patent
Davison et al.

(10) Patent No.: US 7,765,915 B2
(45) Date of Patent: Aug. 3, 2010

(54) VEHICULAR HYDRAULIC SYSTEM WITH DUAL RELIEF VALVE

(75) Inventors: James L. Davison, Freeland, MI (US); Kenneth P. Webber, Birch Run, MI (US); Rick L. Lincoln, Linwood, MI (US); Albert C. Wong, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 310 days.

(21) Appl. No.: 11/901,864

(22) Filed: Sep. 19, 2007

(65) Prior Publication Data

US 2008/0066463 A1 Mar. 20, 2008

Related U.S. Application Data

(60) Provisional application No. 60/846,035, filed on Sep. 20, 2006.

(51) Int. Cl.
*F15B 13/06* (2006.01)

(52) U.S. Cl. ........................................ 91/518
(58) Field of Classification Search .................. 91/516, 91/518
See application file for complete search history.

(56) References Cited

U.S. PATENT DOCUMENTS

| | | | |
|---|---|---|---|
| 3,050,944 A | 8/1962 | Schwartz et al. | |
| 3,633,363 A | 1/1972 | Larsen | |
| 3,662,548 A | 5/1972 | Suzuki et al. | |
| 3,785,393 A | 1/1974 | Tanguy | |
| 3,879,948 A | 4/1975 | Flory | |
| 3,915,186 A | 10/1975 | Thomas | |
| 3,941,142 A | 3/1976 | Adachi et al. | |
| 4,070,858 A | 1/1978 | Hand | |
| 4,074,528 A | 2/1978 | Lourigan et al. | |
| 4,075,840 A | 2/1978 | Jesswein | |
| 4,139,988 A * | 2/1979 | Adachi | 91/520 |
| 4,161,867 A | 7/1979 | Adachi | |
| 4,174,018 A | 11/1979 | Liebert et al. | |
| 4,181,371 A | 1/1980 | Adachi | |
| 4,251,193 A | 2/1981 | Minnis et al. | |
| 4,253,382 A | 3/1981 | Yip | |
| 4,414,809 A | 11/1983 | Burris | |
| 4,420,934 A | 12/1983 | Udono | |
| 4,620,750 A | 11/1986 | Leiber | |
| 4,967,643 A | 11/1990 | Siegel | |
| 5,385,455 A | 1/1995 | Dinsmore et al. | |
| 5,471,838 A | 12/1995 | Suzuki et al. | |
| 5,535,845 A | 7/1996 | Buschur | |

(Continued)

*Primary Examiner*—F. Daniel Lopez
(74) *Attorney, Agent, or Firm*—Cantor Colburn LLP

(57) ABSTRACT

A vehicular hydraulic system having a hydraulic pump and first and second hydraulic applications arranged in series. A dual relief valve defines first and second flow channels, a passageway and a bypass port. The first flow channel is disposed between the hydraulic pump and the first hydraulic application and the second flow channel is disposed between the first hydraulic application and the second hydraulic application. A first valve member controls fluid flow through the passageway and allows fluid flow from the first to the second flow channel through the passageway when fluid pressure within the first flow channel exceeds a first threshold pressure. A second valve member controls fluid flow through the bypass port and allows fluid flow from the second flow channel to a return line through the bypass port when fluid pressure within the second flow channel exceeds a second threshold pressure.

9 Claims, 5 Drawing Sheets

U.S. PATENT DOCUMENTS

| | | |
|---|---|---|
| 5,651,665 A | 7/1997 | Can et al. |
| 5,802,848 A | 9/1998 | McClendon et al. |
| 5,881,630 A | 3/1999 | Buschur et al. |
| 5,960,628 A | 10/1999 | Machesney et al. |
| 6,016,657 A | 1/2000 | Buschur |
| 6,343,469 B1 | 2/2002 | Penninger et al. |
| 6,814,413 B2 | 11/2004 | Davison et al. |
| 7,155,907 B2 | 1/2007 | Desjardins et al. |

* cited by examiner

VEHICULAR HYDRAULIC SYSTEM WITH DUAL RELIEF VALVE

CROSS REFERENCE TO RELATED APPLICATIONS

This application claims priority under 35 U.S.C. 119(e) of U.S. provisional patent application Ser. No. 60/846,035 filed on Sep. 20, 2006 entitled DUAL RELIEF VALVE FOR VEHICULAR HYDRAULIC SYSTEM the disclosure of which is hereby incorporated herein by reference.

BACKGROUND OF THE INVENTION

1. Field of the Invention

The present invention relates to hydraulic systems for vehicles and, more particularly, to a hydraulic system having a hydraulic fluid pump and at least two hydraulic applications.

2. Description of the Related Art

Many trucks with hydraulic braking systems, particularly larger gasoline powered and diesel powered trucks, incorporate hydraulic braking assist systems, rather than vacuum assist systems commonly found in passenger automobiles. The use of vacuum assist braking systems can be problematic in vehicles having a turbo-charged engine and such vehicles will also often employ hydraulic braking assist systems. Furthermore, there is an aftermarket demand for hydraulic braking assist systems for vehicles, such as hotrods, that may not otherwise have a brake assist device or for which the use of a vacuum assist system presents difficulties. Such hydraulic braking assist systems are well known and sold commercially.

Typically, these hydraulic braking assist systems are connected in series between the steering gear and hydraulic pump and use flow from the pump to generate the necessary pressure to provide brake assist as needed. The flow from the pump is generally confined within a narrow range of flow rates and is not intentionally varied to meet changing vehicle operating conditions. Because of the series arrangement, the application of the brakes and engagement of the hydraulic braking assist system can affect the flow of hydraulic fluid to the steering gear, thereby affecting the amount of assist available to the steering gear. Specifically, when a heavy braking load is applied, it causes an increase in backpressure to the pump which can exceed a threshold relief pressure (e.g., 1,500 psi) of the pump. Above this level, a bypass valve of the pump opens to divert a fraction of the outflow back to the intake of the pump, where the cycle continues until the pressure from the brake assist device drops below the threshold value of the bypass valve. During this relief condition, a diminished flow of fluid is sent to the steering gear which may result in a detectable increase in steering effort by the operator of the vehicle to turn the steering wheel under extreme relief conditions.

To at least partially alleviate this condition, it is possible to place a flow-splitter or priority valve in the hydraulic system to divert a portion of the flow of fluid being discharged from the pump to the steering gear under heavy braking conditions. The disclosure of U.S. Pat. No. 6,814,413 B2 describes the use of such a flow-splitter and is hereby incorporated herein by reference. While the use of a flow splitter to divert a portion of the fluid flow being discharged by the pump to the steering gear assist device during heavy braking conditions provides significant advantages, the use of such a flow splitter generally requires that the steering gear device have a pressure relief value that is at least large as the pressure relief value of the brake assist device.

Oftentimes, a steering gear assist device that is adequate for a particular vehicle will have a lower pressure relief value than the brake assist device required for that same vehicle. Thus, the requirement that the steering gear assist device have a pressure relief value that is at least as large as the pressure relief value of the brake assist device often has a direct impact on the selection of a steering gear assist device and results in the selection of a more expensive steering gear assist device.

SUMMARY OF THE INVENTION

The present invention provides a dual relief valve that can be used in a hydraulic system having two hydraulic applications arranged in series.

The invention comprises, in one form thereof, a vehicular hydraulic system including a hydraulic circuit having, arranged in series and in serial order along a primary flow path, a hydraulic pump, a first hydraulic application and a second hydraulic application. A dual relief valve is also operably disposed in the hydraulic circuit. The valve includes a single contiguous valve body defining a first flow channel extending from a first inlet port to a first outlet port, a second flow channel extending from a second inlet port to a second outlet port, a passageway and a bypass port. The valve further includes a first valve member and a second valve member. The passageway provides fluid communication between the first flow channel and the second flow channel and the first valve member is moveably disposed within the valve. The first valve member has a first position wherein the first valve member prevents fluid flow between the first and second flow channels through the passageway and a second position allowing fluid flow from the first flow channel to the second flow channel through the passageway. The first valve member is biased from the first position to the second position when fluid pressure within the first flow channel exceeds a first threshold pressure. The bypass port provides fluid communication between the second flow channel and the primary flow path at a point downstream of the second hydraulic application and upstream of the hydraulic pump. The second valve member is moveably disposed within the valve and has a third position wherein the second valve member prevents fluid flow between the second flow channel and the bypass port and a fourth position allowing fluid flow from the second fluid channel through the bypass port to the primary flow path. The second valve member is biased from the third position to the fourth position when fluid pressure within the second flow channel exceeds a second threshold pressure. The first flow channel defines a portion of the primary flow path downstream of the hydraulic pump and upstream of the first hydraulic application and the second flow channel defines a portion of the primary flow path downstream of the first hydraulic application and upstream of the second hydraulic application.

In some embodiments of the invention, the first threshold pressure is greater than the second threshold pressure. The first and second hydraulic applications may take the form of a hydraulic brake booster device and a hydraulic steering gear device.

An advantage of the present invention is that it provides a compact and space efficient valve structure for providing pressure relief for two separate hydraulic applications that are arranged in series.

Another advantage of the invention is that, in some embodiments of the invention, the relief pressure for the two separate hydraulic applications may be at differing pressure values.

For example, such a dual relief valve may be used in a vehicular hydraulic system to provide an integrated hydraulic brake and steering gear assist system that includes a steering gear assist device having a lower pressure limit value than the brake assist device to thereby provide cost savings in comparison to the use of a steering gear assist device having a hydraulic pressure relief value at least as large as the brake assist device.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Figure 1:
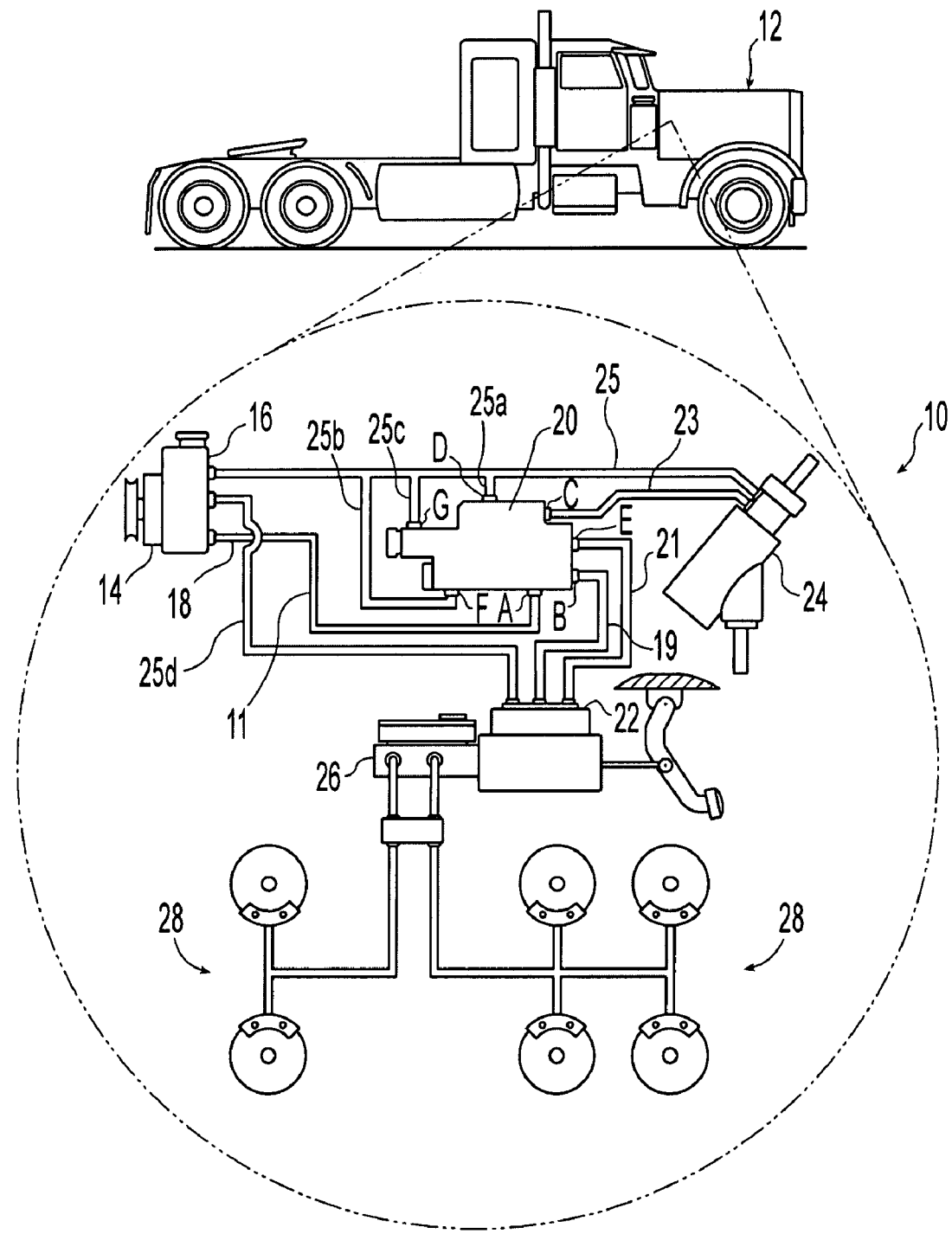
FIG. 1 is a schematic view of a hydraulic system in accordance with the present invention.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

FIG. 1 shows a hydraulic system 10 for a vehicle 12 for assisting in the steering and braking of the vehicle. The hydraulic system includes a hydraulic pump 14 and reservoir 16. The reservoir may be incorporated into the pump 14, as illustrated, or may be located remote from the pump 14.

The pump 14 delivers high pressure hydraulic fluid through discharge line 18 to a dual relief valve 20. The dual relief valve 20, in turn, communicates with a first hydraulic application 22, a second hydraulic application 24, and the reservoir 16, in a manner that depends on the operating conditions of the system 10, as will be explained below.

The first and second hydraulic applications 22, 24 take the form of a hydraulic device or a hydraulic sub-circuit. In the illustrated embodiment, first application 22 is a hydraulic braking assist system or booster device, and the second application 24 is a hydraulic steering gear assist system or device.

The hydraulic brake booster device 22 communicates with a master cylinder 26 and brakes 28 of the braking system. Hydraulic booster device 22 is of a type well known in the art which is disposed in line between the hydraulic pump and the hydraulic master cylinder of a vehicular hydraulic brake system which acts to boost or amplify the force to the brake system in order to reduce brake pedal effort and pedal travel required to apply the brakes as compared with a manual braking system. Such systems are disclosed, for example, in U.S. Pat. Nos. 4,620,750 and 4,967,643, the disclosures of which are both incorporated herein by reference, and provide examples of a suitable booster device 22. Briefly, hydraulic fluid from the supply pump 14 is communicated to the booster device 22 through a booster inlet port and is directed through an open center spool valve slideable in a booster cavity (not shown). A power piston slides within an adjacent cylinder and is exposed to a fluid pressure on an input side of the piston and coupled to an output rod on the opposite side. An input reaction rod connected to the brake pedal extends into the housing and is linked to the spool valve via input levers or links. Movement of the input rod moves the spool valve, creating a restriction to the fluid flow and corresponding boost in pressure applied to the power piston. Steering pressure created by the steering gear assist system 24 is isolated from the boost cavity by the spool valve and does not affect braking but does create a steering assist backpressure to the pump 14. A hydraulic line 25d provides communication between booster device 22 and reservoir 16. Valve 20 operates to manage the flow of hydraulic fluid from the pump 14 to each of the brake assist 22 and steering assist 24 systems in a manner that reduces the interdependence of the steering and braking systems on one another for operation.

Valve 20 includes two separate relief valve structures 32a, 32b within a single valve body 30. In the illustrated embodiment, valve body 30 is a single homogenous mass of material. However, alternative embodiments could utilize separate parts which are secured together to form a single contiguous valve body.

The operation of valve 20 will now be described with reference to FIGS. 2-5. Valve body 30 defines Port A (first inlet port), Port B (first outlet port), Port C (second outlet port), Port D (bypass port), Port E (second inlet port), Port F (first low pressure port) and Port G (second low pressure port). Hydraulic fluid discharged from pump 14 enters valve body 30 through the first inlet port, Port A, while hydraulic fluid from the outlet of brake assist device 22 enters valve body 30 through the second inlet port, Port E. The hydraulic fluid entering valve 20 through Port A from pump 14 will generally flow out of valve 20 through either (1) the first outlet port, i.e., Port B, which is in communication with the inlet to brake assist device 22; (2) the first low pressure port, i.e., Port F, which is in communication with reservoir 16; (3) the second outlet port, i.e., Port C, which is in communication with the inlet to steering gear assist device 24; or (4) the bypass port, Port D, and the second low pressure port, Port G, which are in communication with reservoir 16 as will be described in greater detail below. The hydraulic fluid entering valve 20 through Port E from the outlet of brake assist device 22 will generally flow out of valve 20 through either (1) the second outlet port, i.e., Port C, which is in communication with the inlet of steering gear assist device 24; or (2) the bypass port, Port D, and the second low pressure port, Port G, which is are communication with reservoir 16 as will also be discussed in greater detail below.

Valve 20 includes two relief valve structures 32a, 32b. Relief valve structure 32a is positioned to relieve brake assist device 22 while relief valve structure 32b is positioned to relieve steering gear assist device 24. Each of the relief valves 32a, 32b includes a slideable valve member 34a, 34b which, in turn, each have a small diameter pressure reducing orifice 38a, 38b that allow hydraulic fluid to be communicated through valve members 34a, 34b respectively. Valve chambers 36a, 36b are stepped bore chambers and biasing members 42a, 42b bias members 34a, 34b forwardly into engagement with the land surface 35a, 35b formed at the step in chambers 36a, 36b when relief valve structures 32a, 32b are closed and hydraulic fluid is not actively flowing through orifices 38a, 38b. Biasing members 42a, 42b take the form of helical springs in the illustrated embodiment while valve members 34a, 34b are substantially cylindrical in shape with a hollow interior and having a large diameter portion 27a, 27b that has an outer diameter approximately equivalent to the larger interior diameter of valve chambers 36a, 36b. Valve members 34a, 34b also include a smaller diameter cylindrical portion 29a, 29b at their distal ends which define an interstitial space between valve members 34a, 34b and the interior diameter of valve chambers 36a, 36b.

One-way relief valves 40a, 40b are located within an internal chamber formed in plugs 46a, 46b and include ball members 44a, 44b biased toward a closed position by biasing members 45a, 45b. In the illustrated embodiment, balls 44a, 44b are positioned on valve stems 43a, 43b which are located between valve balls 44a, 44b and springs 45a, 45b. Valve seat members 41a, 41b are press-fit into engagement with plugs 46a, 46b to install valves 40a, 40b within plugs 46a, 46b.

As discussed in detail below, valve member 20 defines a first flow channel 31a that extends from inlet Port A through valve chamber 36a to outlet port B and a second flow channel 31b that extends from inlet port E through valve chamber 36b and passage 49 to outlet port C. Valve chambers 36a, 36b are partitioned into three separate zones. Forward valve chamber portions 33a, 33b form a part of the first and second flow channels 31a, 31b respectively. Valve members 34a, 34b partition valve chambers 36a, 36b between forward portions 33a, 33b and intermediate valve chamber portions 37a, 37b. Pressure reducing orifices 38a, 38b provide fluid communication between the forward portions 33a, 33b and the intermediate portions 37a, 37b. Valve chambers 36a, 36b also include a rear portion 39a, 39b that is disposed between valve balls 44a, 44b and low pressure ports Port F, Port G. O-ring seals 52 are also used to provide a seal between intermediate portions 37a, 37b and rear portions 39a, 39b of valve chambers 36a, 36b.

Figure 2:
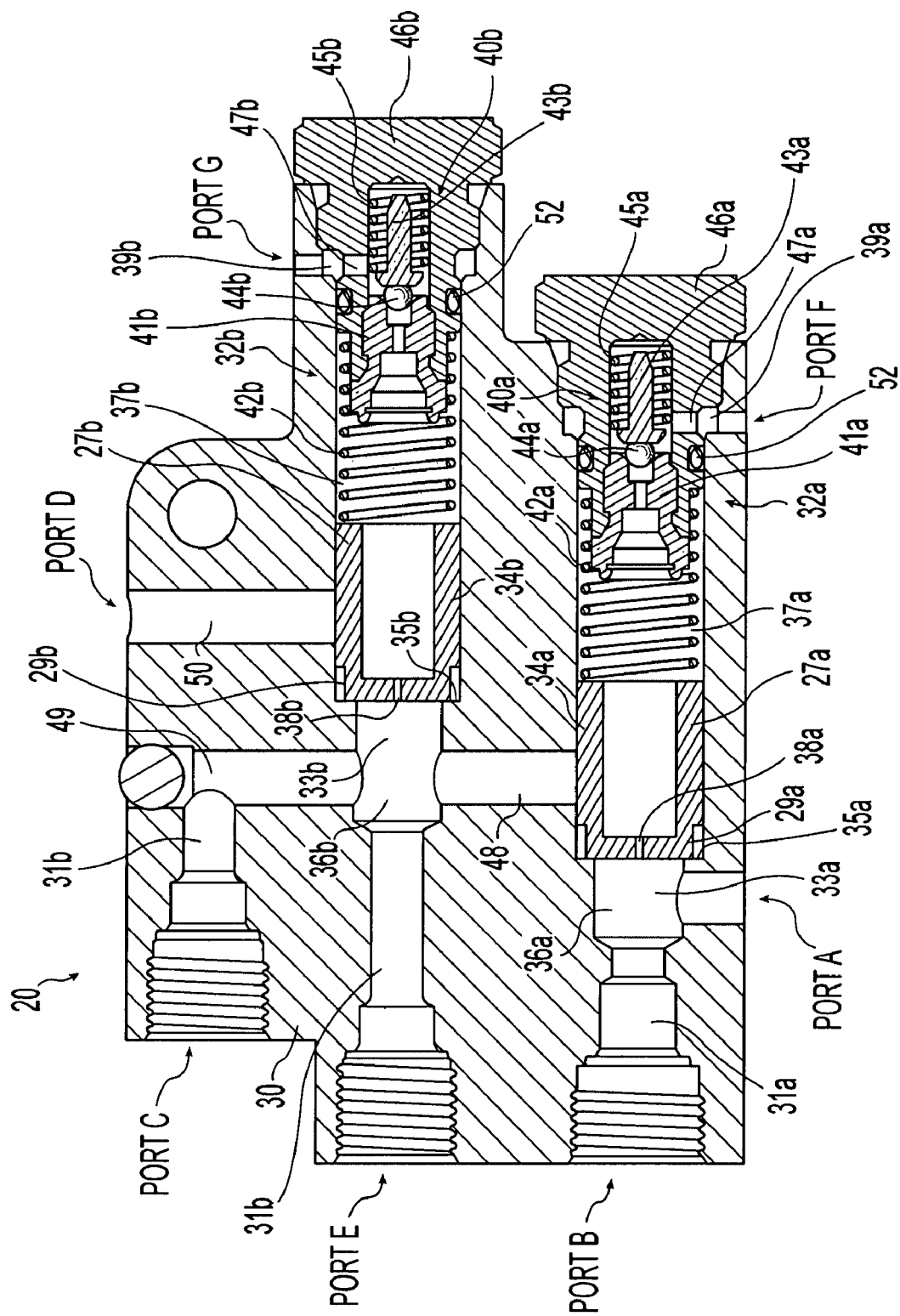
FIG. 2 is a cross sectional view of a dual relief valve where neither of the two hydraulic devices associated with the valve is in relief.

Turning first to FIG. 2, valve 20 is shown in a condition wherein neither of the two relief valve structures 32a, 32b is in relief as might occur when vehicle 12 is being driven straight ahead without applying the brakes. In this condition, fluid from pump 14 enters forward portion 33a of valve chamber 36a through inlet Port A and flows out of valve body 30 through outlet Port B along first flow channel 31a. The pressure of the fluid entering through Port A is communicated through orifice 38a to intermediate valve chamber portion 37a and is insufficient to lift ball member 44a off of its seat 41a. Spring 45a together with the reservoir fluid pressure communicated through Port F and an opening 47a in plug 46a to rear valve chamber portion 39a act on the opposite side of ball 44a to bias ball 44a into sealing engagement with its seat 41a. Consequently valve member 34a is biased forwardly by spring 42a into a position wherein valve member 34 prevents fluid entering valve 20 through Port A from entering passage 48 which extends between chambers 36a and 36b. Similarly, relief valve structure 32b is in a closed position and valve member 34b is biased forwardly to a position that blocks the flow of fluid entering valve 20 through Port E from entering passage 50 which is in communication with bypass Port D. Thus, in the condition illustrated in FIG. 2, all of the fluid entering Port A from pump 14 is directed along first flow channel 31a and out through Port B to the inlet of brake assist device 22 and all of the fluid entering inlet Port E from the outlet of brake assist device 24 flows along second flow channel 31b and is directed out through outlet Port C to the inlet of steering gear assist device 24. Of course, for all real devices there is some inherent loss of fluid due to clearances between individual parts.

Figure 3:
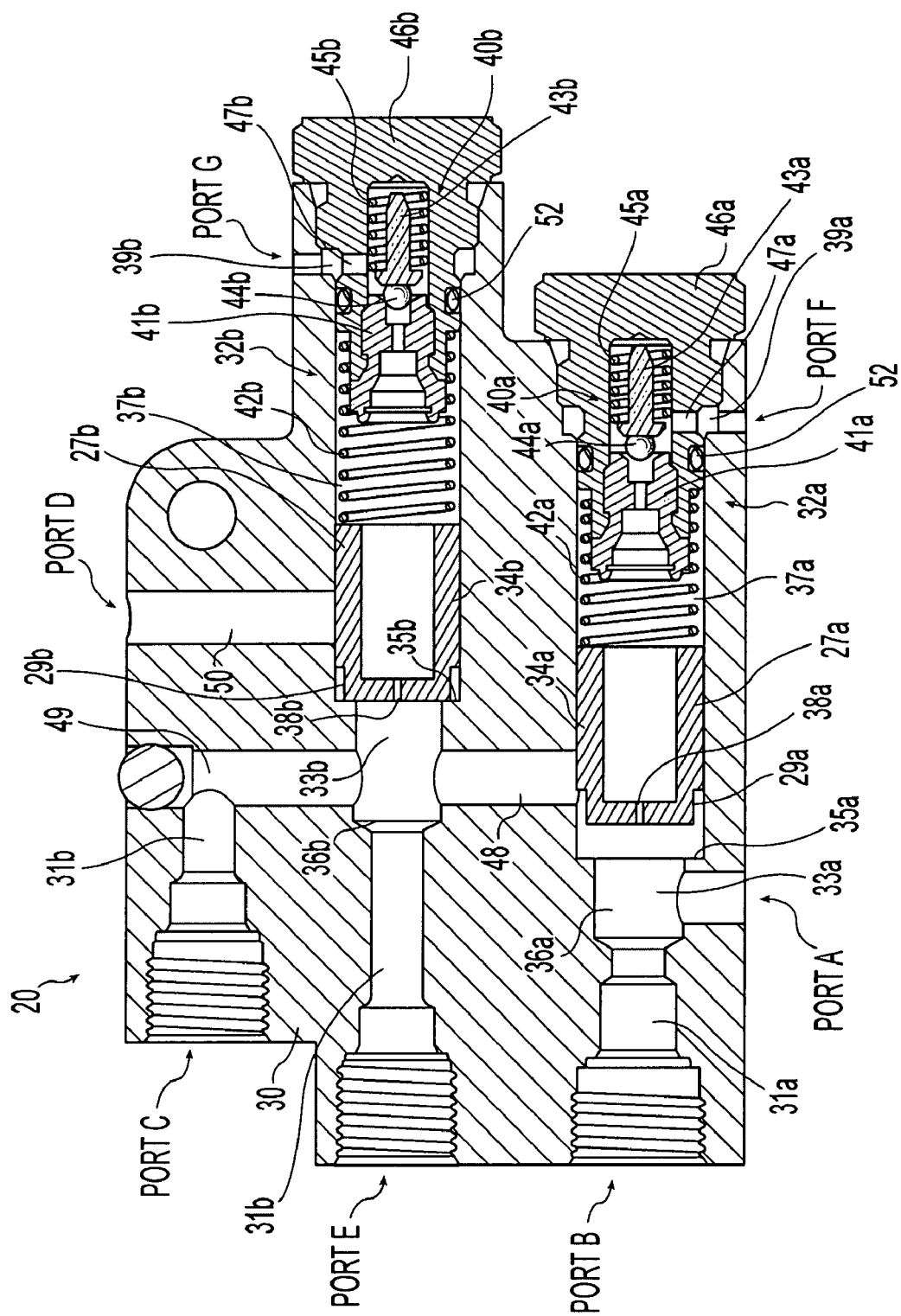
FIG. 3 is a cross sectional view of the dual relief valve wherein the hydraulic device associated with Port B is in relief.

FIG. 3 illustrates the condition when the back pressure present at the inlet to brake assist device 22 has risen and relief valve structure 32a is in relief. When the back pressure at the inlet of device 22 increases, the pressure at Port B and within forward portion 33a of valve chamber 36a will also rise. When one-way relief valve 40a is closed, the pressure in the fluid on both sides of valve member 34a in valve chamber portions 33a and 37a will remain the same due to the fluid communication provided by orifice 38a. Once the fluid pressure is sufficient to open valve 40a, fluid will flow from the forward portion 33a of chamber 36a in communication with Port A and B, through orifice 38a, to the intermediate portion 37a of chamber 36a, through valve 40a and rear chamber portion 39a and out of valve body 30 through Port F. Orifice 38a has a small cross-sectional area relative to valve chamber portions 33a, 37a and fluid flowing through orifice 38a expenses an increase in velocity within orifice 38a followed by a decrease in velocity in valve chamber portion 37a which is accompanied by a reduction in the pressure of the fluid. This use of an orifice having a relatively small cross-sectional area to reduce the pressure of hydraulic fluid actively flowing therethrough is well-known to those having ordinary skill in the art.

Thus, when this fluid flow through valve 40a is initiated and fluid begins flowing through orifice 38a, the pressure of the fluid on the backside of valve member 34a (in valve chamber portion 37a) will be reduced relative to the pressure of the fluid in the forward portion 33a of the chamber 36a. As a result, the force of the higher pressure fluid in forward portion 33a of chamber 36a acting on the front face of valve member 34a will be greater than the combined force exerted by the lower pressure fluid in the intermediate portion 37a of chamber 36a and spring 42a and valve member 34a will slide rearwardly toward valve 40a thereby exposing passage 48 to the fluid flow entering Port A from pump 14. This will allow a portion of the fluid flow from pump 14 to be diverted through passage 48 to Port C where it will flow out of valve body 30 to the inlet of steering gear assist device 24. As a result, the maximum pressure of the fluid within the front portion of chamber 36a and at Ports A and B, and hence at the inlet of brake assist device 22 will be limited to a first threshold pressure at which one-way relief valve 40a is opened. This relief pressure value or threshold pressure is selected so that the pressure at the inlet to brake assist device 22 will not exceed the pressure limit value of device 22. By diverting a relatively large portion of the fluid flow to Port C, and thus to the inlet of steering gear assist device 24, rather than returning the fluid to reservoir 16, steering gear assist device 24 continues to receive a free flow of hydraulic fluid when brake assist device 22 is under a heavy load. In this regard, it is noted that the flow of fluid through Port F to reservoir 16 will be relatively small in comparison to the amount of fluid flow diverted through passage 48. When the pressure of the fluid falls to the point where valve 40a closes, the fluid pressure on both sides of valve member 34a will equalize due to the lack of free flowing fluid through orifice 38a and spring 42a will once again bias member 34a forward to the position illustrated in FIG. 2.

Figure 4:
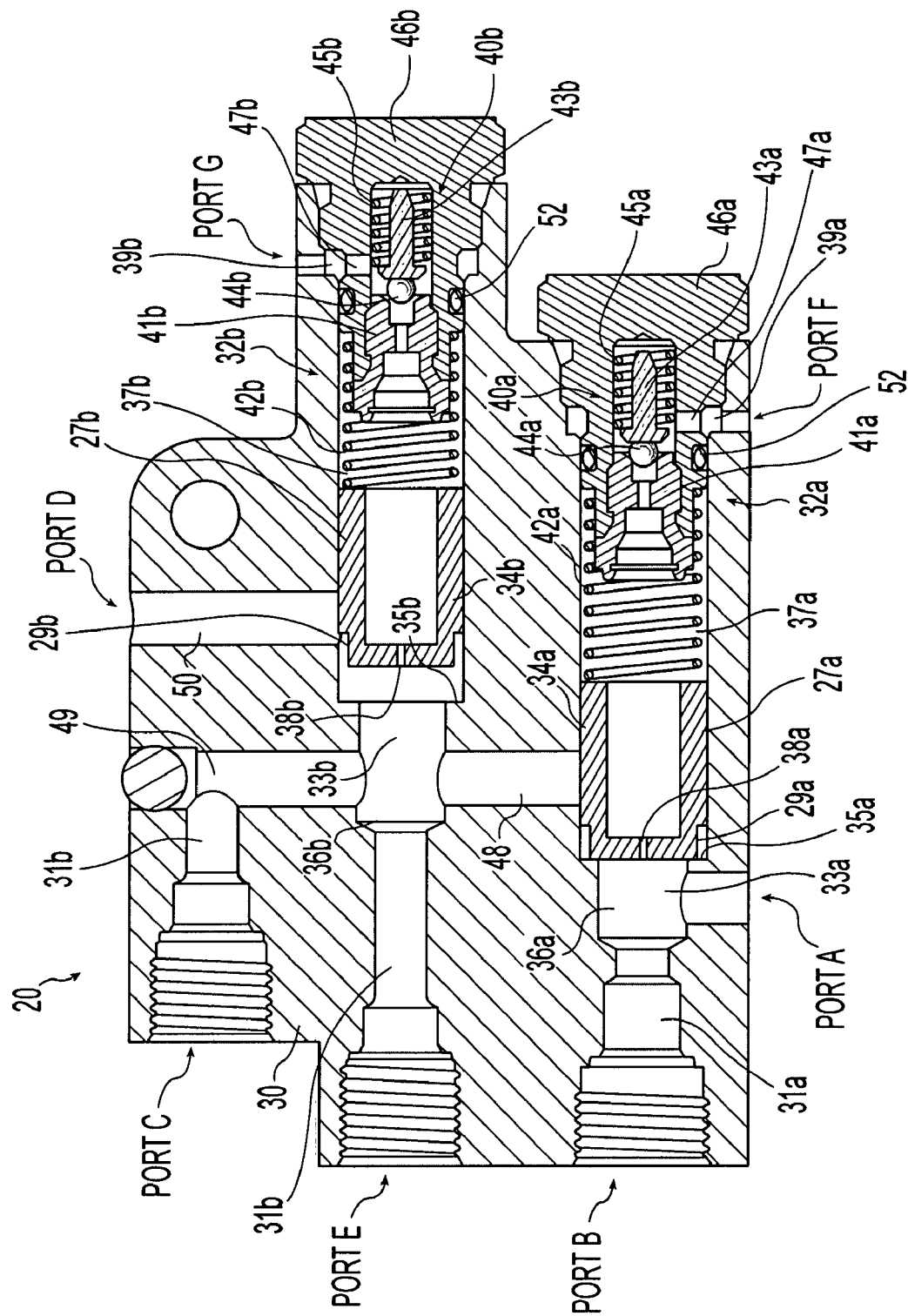
FIG. 4 is a cross sectional view of the dual relief valve wherein the hydraulic device associated with Port C is in relief.

Turning now to FIG. 4, the situation where the back pressure at the inlet to steering gear assist device 24 has risen and relief valve structure 42b is in relief is illustrated. Relief valve structure 42b is similar to valve structure 42a in operation and as the pressure within the forward portion 33b of chamber 36b and at Ports C and E rises together with the back pressure at the inlet to steering gear assist device 24, this increased pressure is communicated through orifice 38b to intermediate valve chamber portion 37b and acts on one-way relief valve 40b. When valve 40b opens, fluid is able to flow from the forward portion 33b of chamber 36b, through orifice 38b, through intermediate portion 37b of chamber 36b, through valve 40b, through opening 47b in plug 46b and rear valve chamber portion 49b, and out of valve body 30 through Port G to reservoir 16. As the fluid flows through orifice 38b its pressure is reduced leading to the rearward sliding of valve member 34b and the exposure of Port D to fluid entering chamber 36b from Port E. The fluid diverted through Port D is directed to reservoir 16 and the quantity of this flow will be significantly greater than the quantity of flow through Port G. As a result of the diversion of fluid through Port D, the maximum pressure within the forward portion 33b of chamber 36b and at Ports C and E, and hence at the inlet to steering gear assist device 24, is limited to a second threshold pressure value at which one-way relief valve 40b opens. This relief pressure value is selected so that the pressure at the inlet to steering gear assist device 24 will not exceed the pressure limit value of device 24. By configuring valve 20 so that the relief pressure of valve structure 32a (associated with brake assist device 22) is higher than the relief pressure of valve structure 32b (associated with steering gear assist device 24), hydraulic circuit can employ a brake assist device 22 having a higher pressure limit value than the steering gear assist device 24. When the pressure of the fluid falls to the point where valve 40b closes, the fluid pressure on both sides of valve member 34b will equalize due to the lack of free flowing fluid through orifice 38b and spring 42b will once again bias member 34b forward to the position illustrated in FIG. 2.

Figure 5:
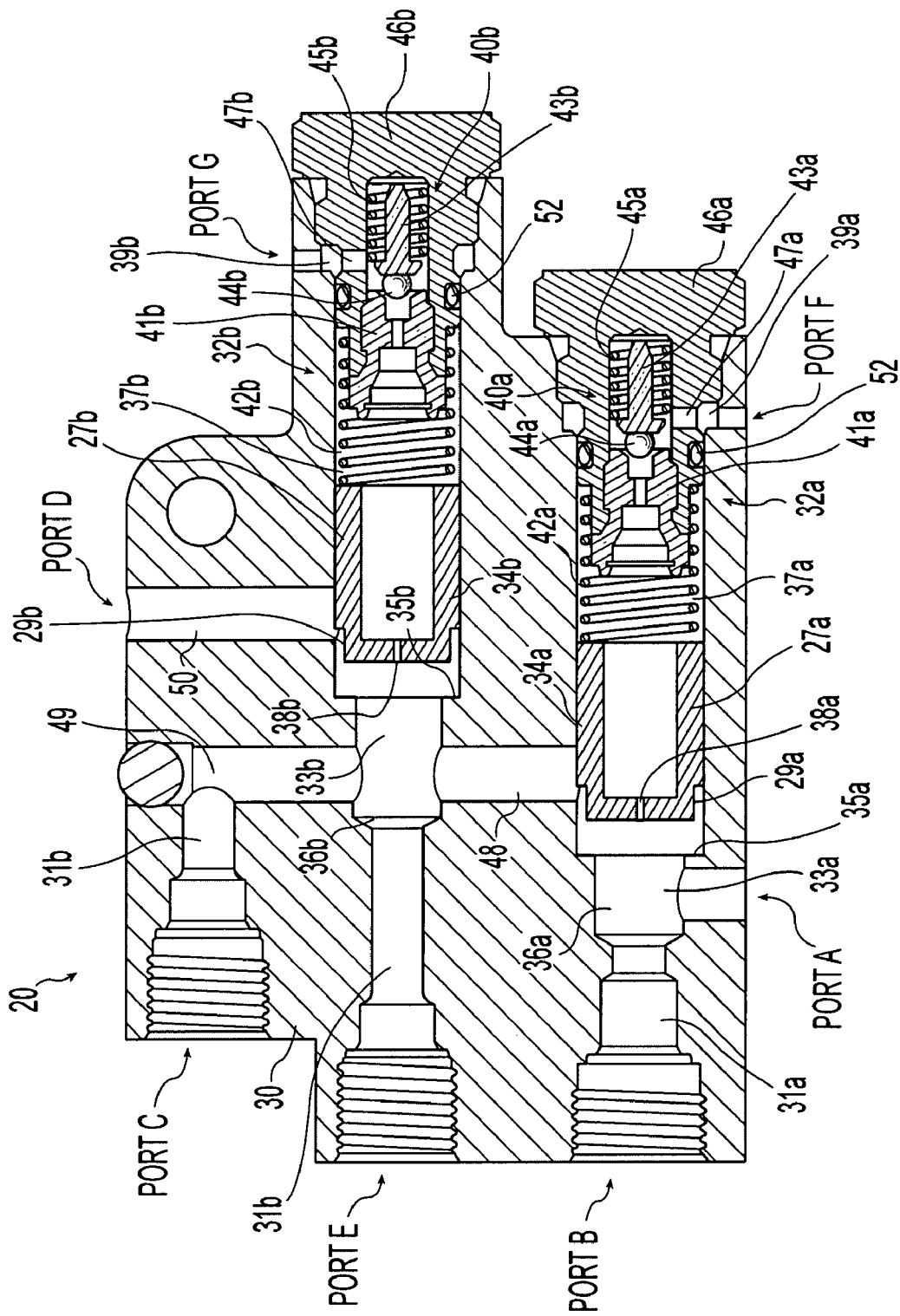
FIG. 5 is a cross sectional view of the dual relief valve wherein both of the hydraulic devices associated with the valve are in relief.

Turning now to FIG. 5, the situation where the back pressure at the inlet to both brake assist device 22 and steering gear assist device 24 have risen and both relief valve structures, 42a and 42b are in relief is illustrated. Each of the relief valve structure 32a, 32b operate as described above with reference to FIGS. 3 and 4. In the situation illustrated in FIG. 5, relief valve structure 32a will limit the pressure of the fluid at Ports A and B while relief valve structure 32b will limit the pressure of the fluid at Ports E and C. The maximum pressure of the fluid permitted by relief valve structure 32b at Port C (in communication with the inlet to steering gear assist device 24) may be less than that permitted by relief valve structure 32a at Port B (in communication with the inlet to brake assist device 22). As can be seen in FIG. 5, the fluid entering passage 48 from chamber 36a is in fluid communication with Port C but, since valve member 34b has slid rearwardly to expose passage 50, may now flow out of valve body 30 through Port D (and, to a lesser extent, Port G) and thereby return to reservoir 16 bypassing both brake assist device 22 and steering gear assist device 24. When the back pressure at one or both of inlets to devices 22, 24 fall, the associated relief valve structure will close and valve 20 will return one of the conditions illustrated in FIGS. 2, 3 and 4 depending upon whether (1) the pressure has fallen only at the inlet to the brake assist device 22, in which case valve 20 will return to the condition shown in FIG. 4 wherein valve 40a is closed and valve member 34a has been biased forward; (2) the pressure has fallen only at the inlet to the steering gear assist device 24, in which case valve 20 will return to the condition shown in FIG. 3 wherein valve 40b is closed and valve member 34b has been biased forward; or (4) the pressure has fallen at the inlets to both brake assist device 22 and steering gear assist device 24, in which case valve 20 will return to the condition shown in FIG. 2 wherein both relief valves 40a, 40b are closed and both valve members 34a, 34b have been biased forward.

As evident from the description presented above, hydraulic circuit 10 includes, in series arrangement and in serial order, hydraulic pump 14, brake booster device 22, steering gear device 24 and reservoir 16. When neither valve structure 32a, 32b of valve member 20 is in relief (FIG. 2), a substantial majority of the fluid flow discharged from pump 14 will flow along primary flow path 11 that extends from the outlet of pump 14, through discharge line 18 through valve 20 from Port A to Port B along flow channel 31a, through hydraulic line 19 to brake booster 22, from brake booster 22 through hydraulic line 21 to valve 20, through valve 20 from Port E to Port C along flow channel 31b, through hydraulic line 23 to steering gear device 24, through hydraulic line 25 to reservoir 16 and then to the inlet of pump 14 wherein the cycle is repeated.

When the fluid pressure upstream of brake booster 22 is elevated above a first threshold pressure, valve 40a will open allowing fluid flow through orifice 38a and the movement of valve member 34a from a position that prevents fluid flow from first flow channel 31a to second flow channel 31b (FIGS. 2 and 4) to a position that allows fluid flow from first flow channel 31a through passageway 48 to second flow channel 31b (FIGS. 3 and 5). In the condition illustrated in FIGS. 3 and 5, the fluid flow entering inlet Port A will be split with a portion of the fluid being communicated to outlet Port B and another portion of the fluid being communicated to the second flow channel 31b through passageway 48. A relatively minor portion of the fluid entering Port A will also be communicated through orifice 38a, valve 40a and discharged from valve 20 through Port F into hydraulic line 25b through which the fluid will be communicated to the primary flow path 11 at a point downstream of steering gear device 24 and upstream of pump 14 in hydraulic line 25. Once the fluid pressure within first flow channel 31a upstream of brake booster device 22 falls below the first threshold pressure, valve 40a will close and valve member 34a will return to its position shown in FIGS. 2 and 4 where it prevents the flow of fluid from flow channel 31a to second flow channel 31b.

When the fluid pressure upstream of steering gear device 24 is elevated above a second threshold pressure, valve 40b will open allowing fluid flow through orifice 38b and the movement of valve member 34b from a position that prevents fluid flow from second flow channel 31b to bypass Port D (FIGS. 2 and 3) to a position that allows fluid flow from second flow channel 31b to bypass Port D (FIGS. 4 and 5). In the condition illustrated in FIGS. 4 and 5, the fluid flow entering second flow channel 31b will be split. When valve 40a is not in a relief condition, the fluid flow entering second flow channel 31b will enter from inlet Port E and, when valve 40a is in a relief condition as illustrated in FIG. 5, the fluid flow entering second flow channel 31b will enter from both inlet Port E and from first flow channel 31a through passageway 48. This fluid flow entering second flow channel 31b will be split with a portion of the fluid being communicated to outlet Port C and another portion of the fluid being communicated to bypass Port D. A relatively minor portion of the fluid entering the second flow channel 31b will also be communicated through orifice 38b, valve 40b and discharged from valve 20 through Port G. The fluid discharged from Port D will be communicated by hydraulic line 25a to the primary flow path 11 at a point downstream of steering gear device 24 and upstream of pump 14 in hydraulic line 25. Similarly, the fluid discharged from Port G will be communicated by hydraulic line 25c to the primary flow path 11 at a point downstream of steering gear device 24 and upstream of pump 14 in hydraulic line 25. Once the fluid pressure within second flow channel 31b upstream of steering gear device 24 falls below the second threshold pressure, valve 40b will close and valve member 34b will return to its position shown in FIGS. 2 and 3 where it prevents the flow of fluid from flow channel 31b to bypass Port D.

As discussed above, by selecting a valve 40b that opens at a lower pressure than the pressure at which valve 40a opens, valve 20 may advantageously be used in hydraulic circuit having a brake booster device 24 arranged in series with a steering gear device 24 wherein the brake booster device 22 has a higher relief pressure than the steering gear device 24.

It is also noted that while the illustrated one-way relief valves 40a, 40b are disposed within valve body 30, one-way relief valves may be installed in alternative physical locations and still be operably disposed in the hydraulic circuit in manner that allows fluid flow through their respective pressure-reducing orifice 38a, 38b when the fluid pressure in the forward portion 33a, 33b of valve chambers 36a, 36b, exceeds the threshold pressure of the valves 40a, 40b. For example, one-way relief valves could be installed in hydraulic lines 25b and 25c in place of valves 40a, 40b.

While the present invention has been described above with reference to a hydraulic system that combines both a steering gear assist device and a brake assist device, it may also be employed with other hydraulic devices and systems. For example, it is known to employ a single hydraulic fluid pump to power the fluid motor of a steering assist device and a second fluid motor associated with a radiator cooling fan. U.S. Pat. No. 5,802,848, for example, discloses a system having a steering gear assist device and a radiator cooling fan with a fluid motor powered by a single hydraulic fluid pump and is incorporated herein by reference. In alternative embodiments of the present invention, the dual relief valve disclosed herein could be employed to facilitate the use of a single hydraulic fluid pump to power the fluid motors of both a steering gear assist device and that of a radiator cooling fan.

Furthermore, the dual relief valve of the present system could be used to control the fluid flow associated with two hydraulic devices (e.g., a brake assist device, a steering gear assist device, a radiator fan having a fluid motor, or other hydraulic device), or two hydraulic circuits, wherein the dual relief valve and the two associated hydraulic devices or circuits, form one portion of a larger complex hydraulic circuit.

It is also possible for dual relief valve 20 to be used in a hydraulic circuit having a reservoir disposed near pump 14 and a remote reservoir or sump disposed near valve 20. This use of dual reservoirs would not only position a pool of hydraulic fluid near both pump 14 and valve 20 but could also be used to increase the overall quantity of hydraulic fluid in the hydraulic circuit and thereby increase the heat sink capacity of the hydraulic fluid within the circuit.

While this invention has been described as having an exemplary design, the present invention may be further modified within the spirit and scope of this disclosure. This application is therefore intended to cover any variations, uses, or adaptations of the invention using its general principles.

What is claimed is:

1. A vehicular hydraulic system comprising:
    a hydraulic circuit having, arranged in series and in serial order along a primary flow path, a hydraulic pump, a first hydraulic application and a second hydraulic application; and
    a dual relief valve operably disposed in the hydraulic circuit, said valve including a single contiguous valve body defining a first flow channel extending from a first inlet port in fluid communication with and downstream of said hydraulic pump to a first outlet port in fluid communication with and upstream of the first hydraulic application, a second flow channel extending from a second inlet port in fluid communication with and downstream of the first hydraulic application to a second outlet port in fluid communication with and upstream of the second hydraulic application, a passageway that provides fluid communication between the first flow channel and the second flow channel and a bypass port that provides fluid communication between the second flow channel and the primary flow path at a point downstream of the second hydraulic application and upstream of the hydraulic pump;
    a first valve member moveably disposed within a first valve chamber within said valve body and including a first pressure reducing orifice providing fluid communication between a first portion of the first valve chamber that forms at least a portion of the first flow channel and a second portion of the first valve chamber in fluid communication with the primary flow path downstream of the second hydraulic application and upstream of the hydraulic pump through a first low pressure port in the valve body, said first valve member having a first position preventing fluid flow between the first and second flow channels through the passageway and a second position allowing fluid flow from the first flow channel to the second flow channel through the passageway, said first valve member being biased from the first position to the second position when fluid pressure within the first flow channel exceeds a first threshold pressure;
    a first one-way relief valve operably disposed in said hydraulic circuit and allowing fluid flow from said first pressure reducing orifice through said second portion and said first low pressure port to said primary flow path only when fluid pressure in said first portion communicated through said first pressure reducing orifice exceeds said first threshold pressure;
    a second valve member moveably disposed within a second valve chamber within said valve body and including a second pressure reducing orifice providing fluid communication between a third portion of the second valve chamber that forms at least a portion of the second flow channel and a fourth portion of the second valve chamber in fluid communication with the primary flow path downstream of the second hydraulic application and upstream of the hydraulic pump through a second low pressure port in the valve body, said second valve member having a third position preventing fluid flow between the second flow channel and the bypass port and a fourth position allowing fluid flow from the second fluid channel through the bypass port to the primary flow path, said second valve member being biased from the third position to the fourth position when fluid pressure within the second flow channel exceeds a second threshold pressure; and
    a second one-way relief valve operably disposed in said hydraulic circuit and allowing fluid flow from said second pressure reducing orifice through said fourth portion and said second low pressure port to said primary flow path only when fluid pressure in said third portion communicated through said second pressure reducing orifice exceeds said second threshold pressure.

2. The vehicular hydraulic system of claim 1 wherein said first and second one-way relief valves are disposed within said valve body.

3. The vehicular hydraulic system of claim 1 wherein said first threshold pressure is greater than said second threshold pressure.

4. The vehicular hydraulic system of claim 1 wherein said first hydraulic application is a hydraulic brake booster device.

5. The vehicular hydraulic system of claim 1 wherein said second hydraulic application is a hydraulic steering gear device.

6. The vehicular hydraulic system of claim 1 wherein the first hydraulic application is a hydraulic brake booster device and the second hydraulic application is a hydraulic steering gear device.

7. The vehicular hydraulic system of claim 6 wherein said first and second one-way relief valves are disposed within said valve body.

8. The vehicular hydraulic system of claim 6 wherein said first threshold pressure is greater than said second threshold pressure.

9. The vehicular system of claim 8 wherein said first and second one-way relief valves are disposed within said valve body.

* * * * *